United States Patent
Ma et al.

(10) Patent No.: US 11,297,306 B2
(45) Date of Patent: Apr. 5, 2022

(54) NEAR-EYE DISPLAY AND METHOD FOR ADJUSTING BRIGHTNESS OF A NEAR-EYE DISPLAY

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhanshan Ma, Beijing (CN); Wenhong Tian, Beijing (CN); Zhen Tang, Beijing (CN); Hao Zhang, Beijing (CN); Lili Chen, Beijing (CN); Haoran Jing, Beijing (CN); Zhiyu Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 434 days.

(21) Appl. No.: 16/344,388

(22) PCT Filed: Oct. 25, 2018

(86) PCT No.: PCT/CN2018/111906
§ 371 (c)(1),
(2) Date: Apr. 24, 2019

(87) PCT Pub. No.: WO2019/196385
PCT Pub. Date: Oct. 17, 2019

(65) Prior Publication Data
US 2021/0337183 A1    Oct. 28, 2021

(30) Foreign Application Priority Data
Apr. 8, 2018 (CN) .......................... 201810305743.8

(51) Int. Cl.
*H04N 13/398*    (2018.01)
*H04N 13/332*    (2018.01)
(Continued)

(52) U.S. Cl.
CPC ........... *H04N 13/398* (2018.05); *G09G 3/003* (2013.01); *G09G 3/3406* (2013.01);
(Continued)

(58) Field of Classification Search
CPC .. H04N 13/398; H04N 13/332; H04N 13/324; H04N 2213/008; G09G 3/003; G09G 3/3406; G09G 2360/145
See application file for complete search history.

(56) References Cited

U.S. PATENT DOCUMENTS 6,900,778 B1 *   5/2005   Yamamoto ......... G02B 27/0093
                                                    345/8
9,905,168 B1 *   2/2018   Richards ............ G02B 27/0172
(Continued)

FOREIGN PATENT DOCUMENTS

CN    102456317 A    5/2012
CN    105103033 A    11/2015
(Continued)

OTHER PUBLICATIONS

PCT International Search Report, Application No. PCT/CN2018/111906, dated Dec. 27, 2018, 6 pages: with English translation.
(Continued)

*Primary Examiner* — Dmitriy Bolotin
(74) *Attorney, Agent, or Firm* — Armstrong Teasdale LLP

(57) ABSTRACT

The present disclosure relates to a near-eye display and a method for adjusting the brightness of a near-eye display. The near-eye display including a first display screen for displaying one of a left eye image and a right eye image, a second display screen for displaying the other of the left eye
(Continued)

image and the right eye image, a detector configured to detect a first detected value indicating brightness of the first display screen and a second detected value indicating brightness of the second display screen, and a controller configured to adjust brightness of at least one of the first display screen and the second display screen based on the first detected value and the second detected value.

19 Claims, 5 Drawing Sheets

(51) Int. Cl.
*H04N 13/324* (2018.01)
*G09G 3/00* (2006.01)
*G09G 3/34* (2006.01)

(52) U.S. Cl.
CPC ......... *H04N 13/324* (2018.05); *H04N 13/332* (2018.05); *G09G 2360/145* (2013.01); *H04N 2213/008* (2013.01)

(56) References Cited

U.S. PATENT DOCUMENTS

| | | | | |
|---|---|---|---|---|
| 2002/0112926 | A1* | 8/2002 | Siberhorn | B66B 1/3492 187/394 |
| 2005/0134547 | A1* | 6/2005 | Wyatt | G09G 3/3406 345/102 |
| 2010/0177111 | A1* | 7/2010 | Abe | G09G 3/3406 345/589 |
| 2011/0298763 | A1* | 12/2011 | Mahajan | G09F 9/3026 345/207 |
| 2013/0088523 | A1* | 4/2013 | Wu | G09G 3/3611 345/690 |
| 2016/0187652 | A1 | 6/2016 | Fujimaki et al. | |
| 2018/0054611 | A1* | 2/2018 | Shin | G06F 1/1686 |
| 2018/0108328 | A1* | 4/2018 | Lee | H04N 13/133 |
| 2018/0151131 | A1* | 5/2018 | Files | G06F 3/1423 |
| 2018/0330694 | A1* | 11/2018 | Klein | G06F 3/048 |
| 2019/0278323 | A1* | 9/2019 | Aurongzeb | G06F 1/1643 |

FOREIGN PATENT DOCUMENTS

| | | |
|---|---|---|
| CN | 105915884 A | 8/2016 |
| CN | 105989815 A | 10/2016 |
| CN | 106098019 A | 11/2016 |
| CN | 106257581 A | 12/2016 |
| CN | 106773067 A | 5/2017 |
| CN | 107003519 A | 8/2017 |
| CN | 107170424 A | 9/2017 |
| CN | 108259884 A | 7/2018 |
| JP | 2011048375 A | 3/2011 |

OTHER PUBLICATIONS

PCT Written Opinion, Application No. PCT/CN2018/111906, dated Dec. 27, 2018, 7 pages.: with English translation of relevant part.
China First Office Action, Application No. 201810305743.8, dated Mar. 20, 2019, 20 pps.: with English translation.
China Second Office Action, Application No. 201810305743.8, dated Sep. 10, 2019, 17 pps.: with English translation.

\* cited by examiner

NEAR-EYE DISPLAY AND METHOD FOR ADJUSTING BRIGHTNESS OF A NEAR-EYE DISPLAY

CROSS REFERENCE TO RELATED APPLICATIONS

This patent application is a National Stage Entry of PCT/CN2018/111906 filed on Oct. 25, 2018, which claims the benefit and priority of Chinese Patent Application No. 201810305743.8 filed on Apr. 8, 2018, the disclosures of which are incorporated by reference herein in their entirety as part of the present application.

BACKGROUND

The present disclosure relates to the field of display technology. More particularly, it relates to a near-eye display and a method for adjusting the brightness of a near-eye display.

Modern computing and display technologies have facilitated the development of "virtual reality" experience systems. Virtual reality technology uses a computer to generate a simulation environment, which is a system simulation of a multi-source information fusing and interactive 3D dynamic view and physical behavior. Virtual reality technology enables users to immerse themselves in the simulation environment.

Virtual reality technology is used in a single-screen based display and a dual-screen based display. For a single-screen based display, the display area of the display screen is equally divided into two parts by software, wherein each half screen matches an optical lens or a group of optical lenses to form a binocular imaging system. However, since the display source is a single screen, the spacing between the left and right half screen display areas cannot be adjusted, and a pupillary distance adjustment where a lens and a display screen both are movable cannot be realized, which has certain limitations when it is adapted to different user with different pupillary distances. For dual-screen based displays, the display source is two different displays, and there also are some problems.

BRIEF DESCRIPTION

Embodiments of the present disclosure provide a near-eye display and a method for adjusting the brightness of a near-eye display.

A first aspect of the present disclosure provides a near-eye display. The near-eye display includes a first display screen for displaying one of a left eye image and a right eye image, a second display screen for displaying the other of the left eye image and the right eye image, a detector configured to detect a first detected value indicating brightness of the first display screen and a second detected value indicating brightness of the second display screen, and a controller configured to adjust brightness of at least one of the first display screen and the second display screen based on the first detected value and the second detected value.

In an embodiment, the controller is further configured to adjust brightness of the first display screen and brightness of the second display screen to be the same.

In an embodiment, the near-eye display further includes a first lens, wherein the first display screen is located at a focal length of the first lens, a first lens barrel between the first lens and the first display screen, a second lens, wherein the second display screen is located at a focal length of the second lens, and a second lens barrel between the second lens and the second display screen. The first display screen, the first lens barrel, and the first lens form a first imaging component, and the second display screen, the second lens barrel, and the second lens form a second imaging component.

In an embodiment, the detector includes a first detector disposed in the first barrel and a second detector disposed in the second lens barrel.

In an embodiment, the near-eye display further includes a circuit board on a side of the first display screen and the second display screen opposite to the display side, wherein the first detector and the second detector is electrically connected to the circuit board.

In an embodiment, the near-eye display further includes a housing for accommodating the first imaging component, the second imaging component and the circuit board; a face receiving portion attached to the housing and located on a side of the first lens and the second lens away from the first display screen and the second display screen.

In an embodiment, the detector includes a photoresistor.

A second aspect of the present disclosure provides a method for adjusting the brightness of the near-eye display described above. The method includes detecting first brightness of a first display screen for displaying one of a left eye image and a right eye image and second brightness of the second display screen for displaying the other of the left eye image and the right eye image, and adjusting brightness of at least one of the first display screen and the second display screen, based on a first detected value indicating a first brightness of the first display screen and a second detected value indicating second brightness of the second display screen.

In an embodiment, adjusting brightness of at least one of the first display screen and the second display screen includes adjusting the first brightness and the second brightness to be the same.

In an embodiment, adjusting the first brightness and the second brightness to be the same includes adjusting one of the first brightness and the second brightness to be the other one.

In an embodiment, adjusting one of the first brightness and the second brightness to be the other one includes adjusting the first brightness to $L_{10}*(1-D)$, where $L_{10}$ is an initial brightness of the first display screen, D represents a first adjustment factor, and D=(the first detected value−the second detected value)/the first detected value, or adjusting the second brightness to $L_{20}*(1+D')$, where $L_{20}$ is an initial brightness of the second display screen, D'=(the first detected value−the second detected value)/the second detected value.

In an embodiment, the first display screen and the second display screen include a liquid crystal display, the first display screen includes a first backlight source and the second display screen includes a second backlight source. Adjusting one of the first brightness and the second brightness to the other one includes adjusting the driving current of the first backlight to $I_{10}*(1-D)$, where $I_{10}$ is an initial driving current of the first backlight, or adjusting the driving current of the second backlight to $I_{20}*(1+D)$, where $I_{20}$ is an initial driving current of the second backlight.

In an embodiment, the first display screen and the second display screen include an OLED display screen, and adjusting one of the first brightness and the second brightness to be the other of the two includes setting a driving current of the first display screen to $I_{10}*(1-D)$, where $I_{10}$ is an initial driving current of the first display screen, or setting a driving current of the second display screen to $I_{20}*(1+D)$, wherein $I_{20}$ is an initial driving current of the second display screen.

In an embodiment, adjusting one of the first brightness and the second brightness to the other one further includes determining whether a first adjustment factor or a second adjustment factor is in a predetermined range, wherein the adjusting is ended if the first adjustment factor or the second adjustment factor is within a predetermined range, and wherein the detecting and the adjusting are repeated if the first adjustment factor or the second adjustment value is not within the predetermined range.

In an embodiment, the adjusting is performed in a solid color mode.

BRIEF DESCRIPTION OF THE DRAWINGS

To describe the technical solutions in the embodiments of the present disclosure more clearly, the accompanying drawings of the embodiments are briefly described below. It should be understood that the drawings described below refer only to some embodiments of the present disclosure, and not to restrict the present disclosure, wherein.

DETAILED DESCRIPTION

Figure 1:
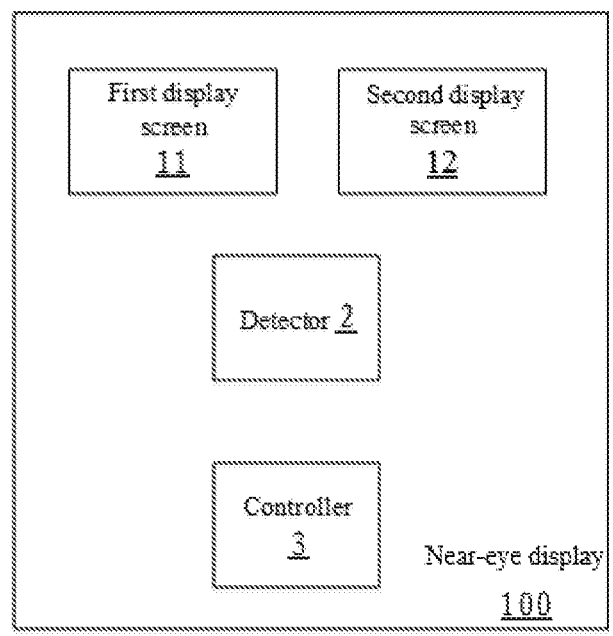
FIG. 1 is a schematic view of a near-eye display according to an embodiment of the present disclosure.

In order to make the technical solutions and advantages of the embodiments of the present disclosure more comprehensible, the technical solutions of the embodiments of the present disclosure are clearly and completely described below with reference to the accompanying drawings. Obviously, the described embodiments are only a part but not all of the embodiments of the present disclosure. Based on the described embodiments of the present disclosure, all other embodiments obtained by those skilled in the art without creative efforts shall also fall within the protection scope of the present disclosure.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. For purposes of the description, hereinafter, the terms "upper", "lower", "right", "left", "vertical", "horizontal", "top", "bottom", and derivatives thereof shall relate to the disclosure, as it is oriented in the drawing figures. The terms "overlying", "atop", "positioned on" or "positioned atop" means that a first element, such as a first structure, is present on a second element, such as a second structure, wherein intervening elements, such as an interface structure, e.g. interface layer, may be present between the first element and the second element. The term "contact" means that a first element, such as a first structure, and a second element, such as a second structure, are connected with or without any intermediary elements at the interface of the two elements.

Since the display source of the near-eye display based on the dual screens are two different display screens, the display brightness of the two display screens is usually different (for example, there is a factory difference, and there is a difference in luminance attenuation as the usage time increases). Thereby, the display effect of the near-eye display will be affected.

FIG. 1 is a schematic view of a near-eye display according to an embodiment of the present disclosure. As shown in FIG. 1, a near-eye display 100 according to an embodiment of the present disclosure includes a first display screen 11 for displaying one of a left eye image and a right eye image and for displaying a left eye image and a right eye image, and a second display screen 12 for displaying the other of the left eye image and the right eye image, a detector 2 configured to detect a first detected value indicating brightness of the first display screen 11 and a second detected value indicating brightness of the second display screen 12, and a controller 3 configured to adjust brightness of at least one of the first display screen 11 and the second display screen 12 based on the first detected value and the second detected value. With such a configuration, the brightness of at least one of the first display screen and the second display screen can be adjusted, realizing a brightness adjustment based on the actual display situation.

In an embodiment, adjusting brightness of at least one of the first display screen and the second display screen includes adjusting the first brightness and the second brightness to be the same, and the controller is further configured to adjust brightness of the first display screen and brightness of the second display screen to be the same. This can solve the problem that the displayed brightness of the left eye image and the right eye image are inconsistent, improve the display effect of the near-eye display, and improve the visual effect of the glasses.

Figure 2:
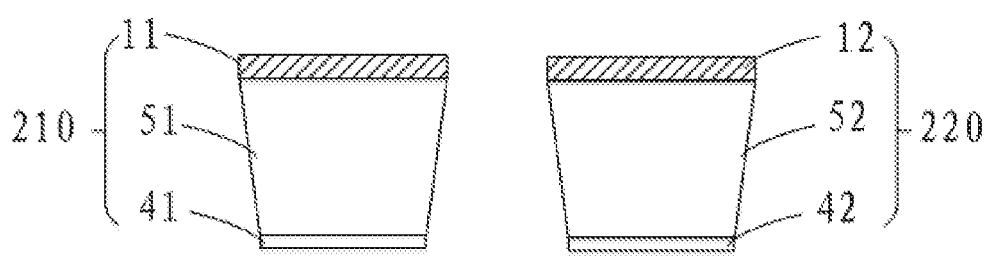
FIG. 2 is a schematic view of a near-eye display according to an embodiment of the present disclosure.

FIG. 2 is a schematic view of a near-eye display according to an embodiment of the present disclosure. As shown in FIG. 2, the near-eye display according to an embodiment of the present disclosure further includes a first lens 41, wherein the first display screen 11 is located at a focal length of the first lens 41, a first lens barrel 51 between the first lens 41 and the first display screen 11, a second lens 42, wherein the second display screen 12 is located at a focal length of the second lens 42, and a second lens barrel 52 between the second lens 42 and the second display screen 12. The first display screen 11, the first lens barrel 51, and the first lens 41 form a first imaging component 210. The second display screen 12, the second lens barrel 52, and the second lens 42 form a second imaging component 220. The lens barrel may include a black light shielding material. With such a configuration, the lens barrel can prevent undesired external light from entering the imaging component, and can prevent light emitted from the display from leaking to an undesired position.

Figure 3:
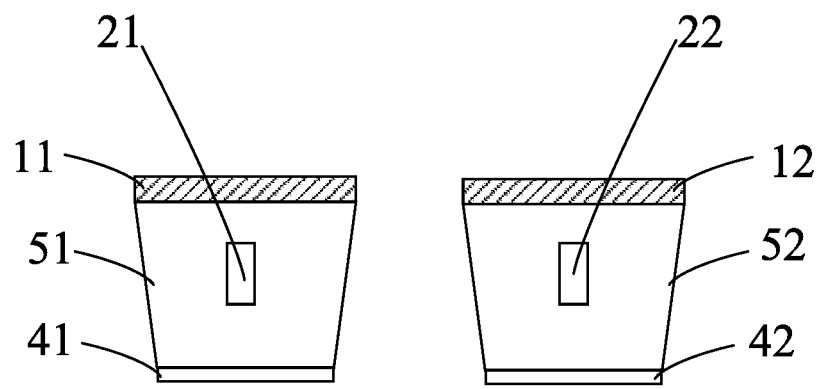
FIG. 3 is a schematic view of a near-eye display according to an embodiment of the present disclosure.

FIG. 3 is a schematic view of a near-eye display according to an embodiment of the present disclosure. As shown in FIG. 3, in an embodiment, the detector may include a first detector 21 disposed in the first barrel 51 and a second detector 22 disposed in the second barrel 52. The first detector 21 can detect the brightness of the first display screen 11, and the second detector 22 can detect the brightness of the second display screen 12.

Figure 4:
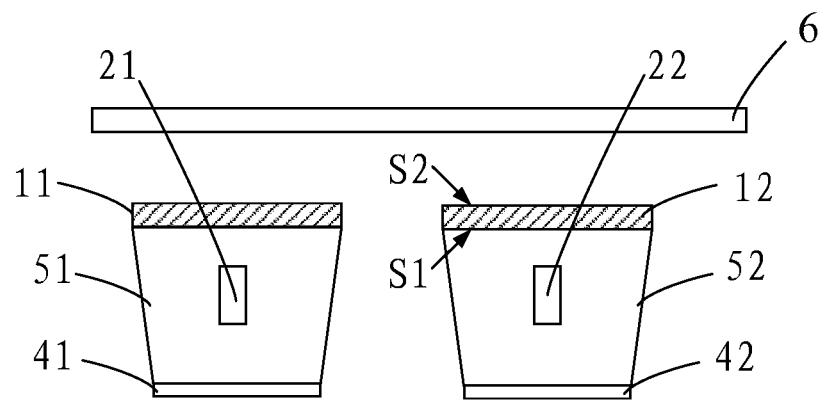
FIG. 4 is a schematic view of a near-eye display according to an embodiment of the present disclosure.

FIG. 4 is a schematic view of a near-eye display according to an embodiment of the present disclosure. As shown in FIG. 4, in an embodiment, the near-eye display further includes a circuit board 6 on a side S2 of the first display screen 11 and the second display screen 12 opposite to the display side S21. The first detector 21 and the second detector 22 are electrically connected to the circuit board 6. In an embodiment, the first detector 21 and the second detector 22 may include a photoresistor. For example, the first detector and the second detector may be electrically connected to a circuit board 6, such as a printed circuit board (PCB), by a flexible printed circuit (FPC).

Figure 5:
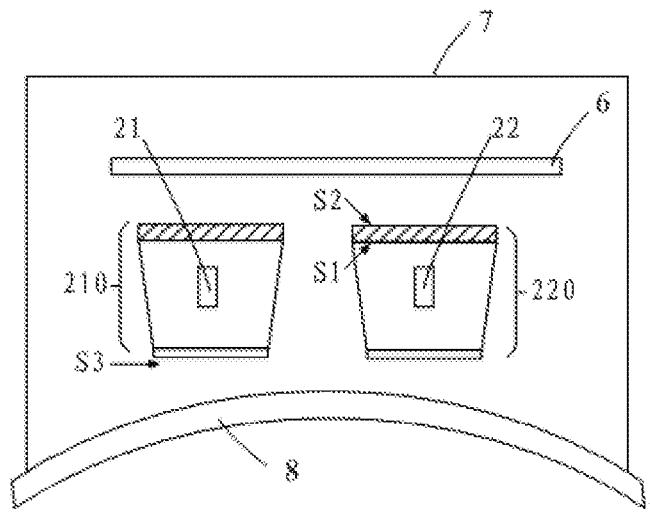
FIG. 5 is a schematic view of a near-eye display according to an embodiment of the present disclosure.

FIG. 5 is a schematic view of a near-eye display according to an embodiment of the present disclosure. As shown in FIG. 5, in an embodiment, the near-eye display further includes a housing 7 for accommodating the first imaging component 210, the second imaging component 220, and the circuit board 6, a face receiving portion 8 attached to the housing 7 and located on a side S3 of the first lens 41 and the second lens 42 away from the first display screen 11 and the second display screen.

Embodiments of the present disclosure also provide a method for detecting the brightness of a near-eye display as described above.

Figure 6:
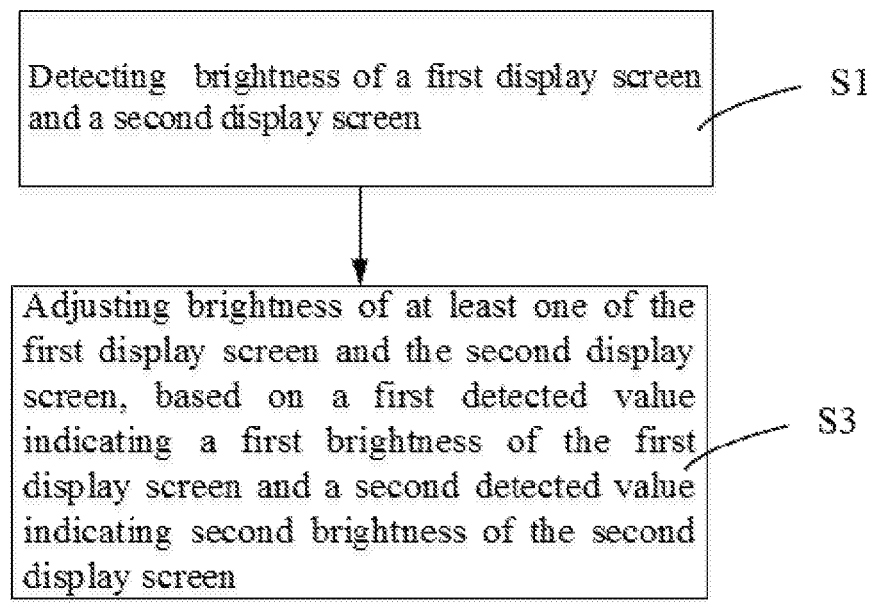
FIG. 6 is a flowchart of a method for detecting brightness of a near-eye display according to an embodiment of the present disclosure.

FIG. 6 is a flow chart of a method for detecting brightness of the near-eye display described above according to an embodiment of the present disclosure. As shown in FIG. 6, in an embodiment, a method for detecting brightness of a near-eye display includes:

S1, detecting first brightness of a first display screen for displaying one of a left eye image and a right eye image and second brightness of the second display screen for displaying the other of the left eye image and the right eye image;

S3, adjusting brightness of at least one of the first display screen and the second display screen, based on a first detected value indicating a first brightness of the first display screen and a second detected value indicating second brightness of the second display screen.

In an embodiment, adjusting brightness of at least one of the first display screen and the second display screen includes adjusting the first brightness and the second brightness to be the same. In an embodiment, one of the first brightness and the second brightness may be adjusted to the other of the first brightness and the second brightness. In an embodiment, both the first brightness and the second brightness can be adjusted to other desired brightness.

In an embodiment, adjusting one of the first brightness and the second brightness to be the other one includes:

Adjusting the first brightness to $L_{10}*(1-D)$, where $L_{10}$ is an initial brightness of the first display screen, D represents a first adjustment factor, and D=(the first detected value−the second detected value)/the first detected value. In this embodiment, the first display screen is used as a follow-up screen to adjust the first display screen such that its brightness coincides with the brightness of the second display screen.

Or, adjusting the second brightness to $L_{20}*(1+D')$, where $L_{20}$ is an initial brightness of the second display screen, D'=(the first detected value−the second detected value)/the second detected value. In this embodiment, the second display screen is used as a follow-up screen to adjust the second display screen such that its brightness coincides with the brightness of the first display screen.

It can be understood that the initial brightness here refers to the brightness before each adjustment.

The first display screen and the second display screen may include a liquid crystal display or an OLED display, and may include any other type of display.

Figure 7:
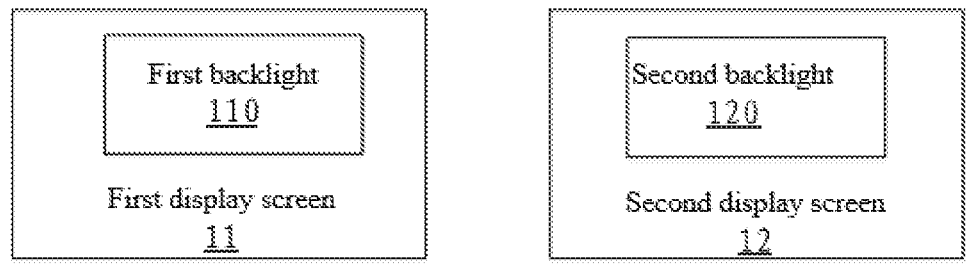
FIG. 7 is a schematic view of a first display screen and a second display screen according to an embodiment of the present disclosure.

FIG. 7 is a schematic view of a first display screen and a second display screen according to an embodiment of the present disclosure. As shown in FIG. 7, in an embodiment, the first display screen 11 and the second display screen 12 include a liquid crystal display, the first display screen 11 includes a first backlight 110 and the second display screen 12 includes a second backlight 120. Adjusting one of the first brightness and the second brightness to the other one may include:

Adjusting the driving current of the first backlight to $I_{10}*(1-D)$, where $I_{10}$ is an initial driving current of the first backlight In this embodiment, the first display screen is used as a follow-up screen to adjust the first display screen such that its brightness is same with the brightness of the second display screen.

Or, adjusting the driving current of the second backlight to $I_{20}*(1+D)$, where $I_{20}$ is an initial driving current of the second backlight. In this embodiment, the second display screen is used as a follow-up screen to adjust the second display screen such that its brightness is same with the brightness of the first display screen.

In an embodiment, the first display screen and the second display screen include an OLED display screen, and adjusting one of the first brightness and the second brightness to be the other one includes:

Setting a driving current of the first display screen to $L_{10}*(1-D)$, where $L_{10}$ is an initial driving current of the first display screen. In this embodiment, the first display screen is used as a follow-up screen to adjust the first display screen such that its brightness is same with the brightness of the second display screen.

Or, setting a driving current of the second display screen to $L_{20}*(1+D')$, where $L_{20}$ is an initial driving current of the second display screen. In this embodiment, the second display screen is used as a follow-up screen to adjust the second display screen such that its brightness is same with the brightness of the first display screen.

Further, adjusting one of the first brightness and the second brightness to the other one further includes determining whether a first adjustment factor or a second adjustment factor is in a predetermined range, wherein the adjusting is ended if the first adjustment factor or the second adjustment factor is within a predetermined range, and wherein the detecting and the adjusting are repeated if the first adjustment factor or the second adjustment value is not within the predetermined range.

Figure 8:
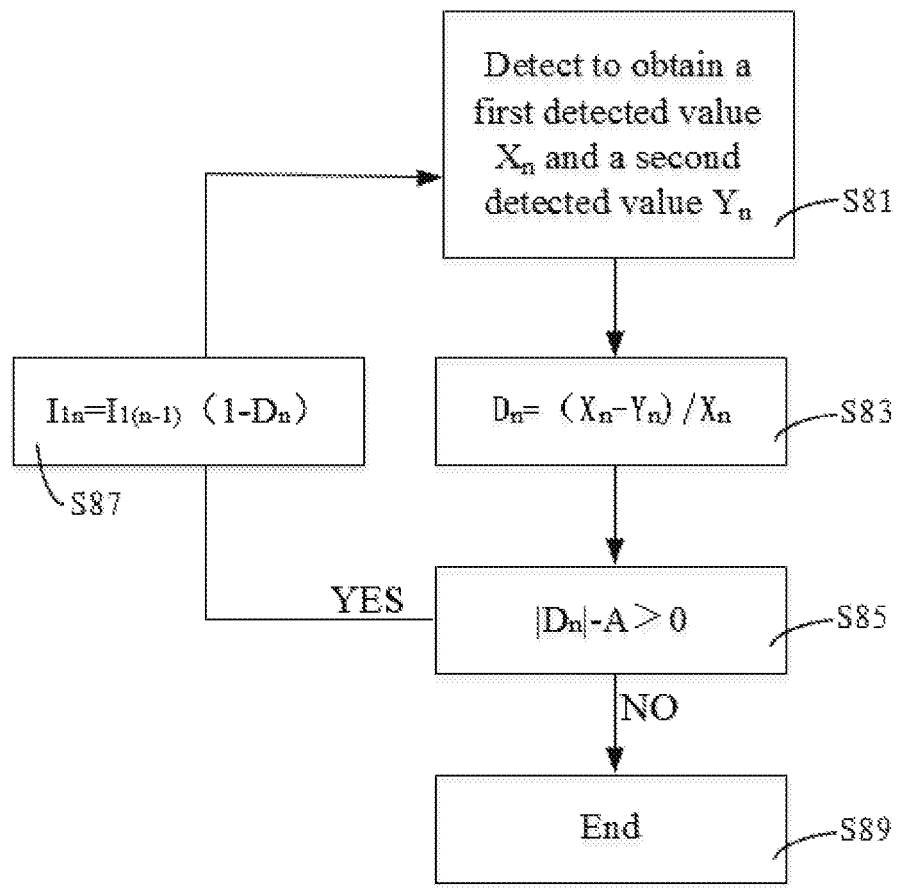
FIG. 8 is a schematic view of a method for adjusting a near-eye display according to an embodiment of the present disclosure.

FIG. 8 is a schematic view of a method for adjusting a near-eye display according to an embodiment of the present disclosure. As shown in FIG. 8, the method for adjusting a near-eye display according to an embodiment of the present disclosure includes:

S81, detecting first brightness of a first display screen for displaying one of a left eye image and a right eye image and second brightness of the second display screen for displaying the other of the left eye image and the right eye image, to obtain a first detected value and a second detected value $Y_n$. For example, photoresist can be used as detector. In such embodiments, since the illuminance detected by the detector using the photoresistor is linear with the brightness of the display screen, the detected illuminance value obtained by the first detector can be recorded as the first detected value $X_n$, and the detected illuminance value obtained by the second detector is recorded as the second detection value $Y_n$.

S83, calculating the adjustment factor $D_n$ using equation (1), where equation (1) is: $D_n=(X_n-Y_n)/X_n$.

S85, comparing the absolute value of $D_n$ with the predetermined value A to determine whether $D_n$ is in the predetermined range [−A, +A]. For example, determine whether the difference ($|D_n|-A$) between the absolute value of $D_n$ and A is greater than zero. In an embodiment, the predetermined value A may be 3%, 4%, 5%, or 6%.

If the result of the determination is NO, that is, when $|Dn|-A \leq 0$, the current adjustment is ended (step S89).

If the result of the determination is YES, that is, if $|D_n|-A>0$, the process proceeds to step S87.

S87, adjusting the driving current $I_{1n}$ of the first backlight or the first display screen to $I_{1(n-1)}*(1-D_n)$, where $I_{1(n-1)}$ is an initial drive current of the first backlight or the first display at the beginning of each ($n^{th}$) adjustment cycle. The above steps S81, S83, and S85 are then iteratively repeated.

Figure 9:
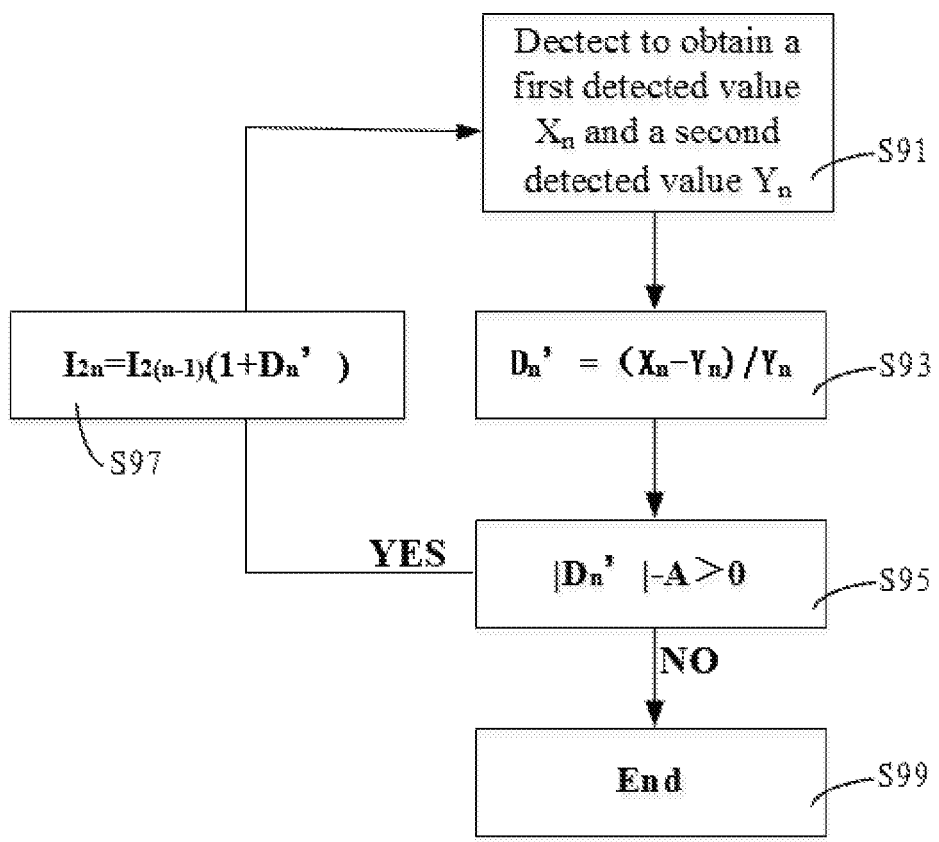
FIG. 9 is a schematic view of a method for adjusting a near-eye display, according to an embodiment of the present disclosure.

FIG. 9 is a schematic view of a method for adjusting a near-eye display according to an embodiment of the present disclosure. As shown in FIG. 9, a method for adjusting a near-eye display according to an embodiment of the present disclosure includes:

S91, detecting first brightness of a first display screen for displaying one of a left eye image and a right eye image and second brightness of the second display screen for displaying the other of the left eye image and the right eye image, to obtain a first detected value $X_n$ and a second detected value $Y_n$. For example, photoresist can be used as detector. In such embodiments, since the illuminance detected by the detector is linear with the brightness of the display screen, the detected illuminance value obtained by the first detector can be recorded as the first detected value $X_n$, and the detected illuminance value obtained by the second detector is recorded as the second detection value $Y_n$.

S93, calculating the adjustment factor $D_n'$ using equation (1), where equation (1) is: $D_n'=(X_n-Y_n)/Y_n$.

S95, comparing the absolute value of $D_n'$ with the predetermined value A to determine whether $D_n'$ is in the predetermined range [−A, +A]. For example, determine whether the difference ($|D_n'|-A$) between the absolute value of $D_n'$ and A is greater than zero. In an embodiment, the predetermined value A may be 3%, 4%, 5%, or 6%.

If the result of the determination is NO, that is, when $|Dn'|-A \leq 0$, the current adjustment is ended (step S99).

In the case where the determination result is YES, that is, in the case of $|Dn'|-A>0$, the process proceeds to step S97.

S97, adjusting the driving current $I_{2n}$ of the second backlight or the second display screen to $I_{2n(n-1)}*(1+D_n')$, where $I_{2(n-1)}$ is an initial drive current of the second backlight or the second display at the beginning of each ($n^{th}$) adjustment cycle. The above steps S91, S93, and S95 are then iteratively repeated.

According to embodiments of the present disclosure, the above adjustment can be performed in a solid color mode. For example, the first display screen and the second display screen can be set to display a white color for brightness adjustment. After completing the above adjustment steps, the startup interface is entered, so that the near-eye display works normally.

The controller or detector described herein may be implemented as a combination of a processor and a memory, wherein the processor executes a program stored in the memory to implement the functionality of the corresponding controller or detector. The controller or detector described herein may be implemented in a hardware implementation, including application specific integrated circuits (ASICs), field programmable gate arrays (FPGAs), and the like.

The specific embodiments have been described, and are not intended to limit the scope of the disclosure. In fact, the novel embodiments described herein can be implemented in a variety of other forms. In addition, various omissions, substitutions, and changes in the form of the embodiments described herein may be made without departing from the spirit of the disclosure. The following claims and their equivalents are intended to cover such forms or modifications that fall within the scope and spirit of the disclosure.

What is claimed is:

1. A near-eye display comprising:
   a first display screen for displaying one of a left eye image and a right eye image;
   a second display screen for displaying the other of the left eye image and the right eye image;
   a detector configured to detect a first detected value indicating brightness of the first display screen and a second detected value indicating brightness of the second display screen;
   a controller configured to adjust brightness of at least one of the first display screen and the second display screen based on the first detected value and the second detected value;
   a first lens, wherein the first display screen is located at a focal length of the first lens;
   a first lens barrel between the first lens and the first display screen;
   a second lens, wherein the second display screen is located at a focal length of the second lens; and
   a second lens barrel between the second lens and the second display screen,
   wherein the first display screen, the first lens barrel, and the first lens form a first imaging component, and wherein the second display screen, the second lens barrel, and the second lens form a second imaging component.

2. The near-eye display according to claim 1, wherein the controller is further configured to adjust brightness of the first display screen and brightness of the second display screen to be the same.

3. A method for adjusting brightness of a near-eye display according to claim 2, the method comprising:
   detecting first brightness of the first display screen for displaying one of the left eye image and the right eye image and second brightness of the second display screen for displaying the other of the left eye image and the right eye image; and
   adjusting brightness of at least one of the first display screen and the second display screen, based on the first detected value indicating a first brightness of the first display screen and the second detected value indicating second brightness of the second display screen.

4. The near-eye display according to claim 1, wherein the detector comprises a first detector disposed in the first lens barrel and a second detector disposed in the second lens barrel.

5. The near-eye display according to claim 4, further comprising a circuit board on a side of the first display screen and the second display screen opposite to the display side, wherein the first detector and the second detector are electrically connected to the circuit board.

6. The near-eye display according to claim 5, further comprising:

a housing for accommodating the first imaging component, the second imaging component, and the circuit board; and a face receiving portion attached to the housing and located on a side of the first lens and the second lens away from the first display screen and the second display screen.

7. A method for adjusting brightness of a near-eye display according to claim 5, the method comprising:

detecting first brightness of the first display screen for displaying one of the left eye image and the right eye image and second brightness of the second display screen for displaying the other of the left eye image and the right eye image; and adjusting brightness of at least one of the first display screen and the second display screen, based on the first detected value indicating a first brightness of the first display screen and the second detected value indicating second brightness of the second display screen.

8. A method for adjusting brightness of a near-eye display according to claim 4, the method comprising:

detecting first brightness of the first display screen for displaying one of the left eye image and the right eye image and second brightness of the second display screen for displaying the other of the left eye image and the right eye image; and adjusting brightness of at least one of the first display screen and the second display screen, based on the first detected value indicating a first brightness of the first display screen and the second detected value indicating second brightness of the second display screen.

9. The near-eye display according to claim 1, wherein the detector comprises a photoresistor.

10. A method for adjusting brightness of a near-eye display according to claim 1, comprising:

detecting first brightness of the first display screen for displaying one of the left eye image and the right eye image and second brightness of the second display screen for displaying the other of the left eye image and the right eye image; and adjusting brightness of at least one of the first display screen and the second display screen, based on the first detected value indicating a first brightness of the first display screen and the second detected value indicating second brightness of the second display screen.

11. The method according to claim 10, wherein adjusting brightness of at least one of the first display screen and the second display screen comprises adjusting the first brightness and the second brightness to be the same.

12. The method according to claim 11, wherein adjusting the first brightness and the second brightness to be the same comprises adjusting one of the first brightness and the second brightness to be the other one.

13. The method according to claim 12, wherein adjusting one of the first brightness and the second brightness to be the other one comprises one of:

adjusting the first brightness to $L_{10}*(1-D)$, wherein $L_{10}$ is an initial brightness of the first display screen, D represents a first adjustment factor, and D=(the first detected value−the second detected value)/the first detected value; and adjusting the second brightness to $L_{20}*(1+D')$, where $L_{20}$ is an initial brightness of the second display screen, D'=(the first detected value−the second detected value)/the second detected value.

14. The method according to claim 13, wherein the first display screen and the second display screen comprise a liquid crystal display, wherein the first display screen comprises a first backlight and the second display screen comprises a second backlight, and wherein adjusting one of the first brightness and the second brightness to the other one comprises one of:

adjusting the driving current of the first backlight to $I_{10}*(1-D)$, wherein $I_{10}$ is an initial driving current of the first backlight; and adjusting the driving current of the second backlight to $I_{20}*(1+D)$, where $I_{20}$ is an initial driving current of the second backlight.

15. The method according to claim 14, wherein adjusting one of the first brightness and the second brightness to the other one further comprises determining whether a first adjustment factor or a second adjustment factor is in a predetermined range, wherein the adjusting is ended if the first adjustment factor or the second adjustment factor is within a predetermined range, and wherein the detecting and the adjusting are repeated if the first adjustment factor or the second adjustment factor is not within the predetermined range.

16. The method according to claim 13, wherein the first display screen and the second display screen comprise an OLED display screen, and wherein adjusting one of the first brightness and the second brightness to the other one comprises one of:

setting a driving current of the first display screen to $I_{10}*(1-D)$, where $I_{10}$ is an initial driving current of the first display screen; and setting a driving current of the second display screen to $I_{20}*(1+D)$, where $I_{20}$ is an initial driving current of the second display screen.

17. The method according to claim 16, wherein adjusting one of the first brightness and the second brightness to the other one further comprises determining whether a first adjustment factor or a second adjustment factor is in a predetermined range, wherein the adjusting is ended if the first adjustment factor or the second adjustment factor is within a predetermined range, and wherein the detecting and the adjusting are repeated if the first adjustment factor or the second adjustment factor is not within the predetermined range.

18. The method according to claim 10, wherein the adjusting is performed in a solid color mode.

19. A method for adjusting brightness of a near-eye display according to claim 1, the method comprising:

detecting first brightness of the first display screen for displaying one of the left eye image and the right eye image and second brightness of the second display screen for displaying the other of the left eye image and the right eye image; and adjusting brightness of at least one of the first display screen and the second display screen, based on the first detected value indicating a first brightness of the first display screen and the second detected value indicating second brightness of the second display screen.

\* \* \* \* \*

UNITED STATES PATENT AND TRADEMARK OFFICE
CERTIFICATE OF CORRECTION

| | | |
|---|---|---|
| PATENT NO. | : 11,297,306 B2 | Page 1 of 1 |
| APPLICATION NO. | : 16/344388 | |
| DATED | : April 5, 2022 | |
| INVENTOR(S) | : Ma et al. | |

It is certified that error appears in the above-identified patent and that said Letters Patent is hereby corrected as shown below:

In the Specification

Column 6, Line 63, "first detected value and" should read -- first detected value $X_n$ and --.

In the Claims

In Claim 13, Column 10, Line 1, "where $L_{20}$" should read -- wherein $L_{20}$ --.
In Claim 14, Column 10, Line 15, "where $I_{20}$" should read -- wherein $I_{20}$ --.
In Claim 16, Column 10, Line 33, "where $I_{10}$" should read -- wherein $I_{10}$ --.
In Claim 16, Column 10, Line 36, "where $I_{20}$" should read -- wherein $I_{20}$ --.

Signed and Sealed this
Twelfth Day of July, 2022

Katherine Kelly Vidal
*Director of the United States Patent and Trademark Office*